(12) United States Patent
Quine et al.

(10) Patent No.: US 7,149,780 B2
(45) Date of Patent: Dec. 12, 2006

(54) METHOD FOR DETERMINING E-MAIL ADDRESS FORMAT RULES

(75) Inventors: Douglas B. Quine, Bethel, CT (US); Karl H Schumacher, Westport, CT (US)

(73) Assignee: Pitney Bowes Inc., Stamford, CT (US)

(*) Notice: Subject to any disclaimer, the term of this patent is extended or adjusted under 35 U.S.C. 154(b) by 712 days.

(21) Appl. No.: 10/017,242

(22) Filed: Dec. 14, 2001

(65) Prior Publication Data

US 2003/0115280 A1 Jun. 19, 2003

(51) Int. Cl.
*G06F 15/16* (2006.01)

(52) U.S. Cl. ............... 709/206; 709/203; 709/207; 709/238; 709/242; 707/6; 707/7

(58) Field of Classification Search ........ 709/206–207, 709/246, 219, 204–205, 223–224, 227–229, 709/203, 238, 242; 379/100.08; 707/6
See application file for complete search history.

(56) References Cited

U.S. PATENT DOCUMENTS

| | | | |
|---|---|---|---|
| 5,138,653 A | 8/1992 | Le Clercq | 379/96 |
| 5,281,962 A | 1/1994 | Vanden | 340/825 |
| 5,283,856 A | 2/1994 | Gross | 395/51 |
| 5,329,405 A * | 7/1994 | Hou et al. | 707/6 |
| 5,333,152 A | 7/1994 | Wilber | 379/98 |
| 5,333,266 A | 7/1994 | Boaz et al. | 395/200 |
| 5,377,354 A | 12/1994 | Scannell et al. | 395/650 |
| 5,381,527 A | 1/1995 | Inniss et al. | 395/200 |
| 5,406,557 A | 4/1995 | Baudoin | 370/61 |
| 5,428,663 A | 6/1995 | Grimes et al. | 379/57 |
| 5,436,960 A | 7/1995 | Campana, Jr. | 379/58 |
| 5,455,572 A | 10/1995 | Cannon et al. | 340/825 |
| 5,479,408 A | 12/1995 | Will | 370/94.1 |
| 5,479,411 A | 12/1995 | Klein | 379/88 |
| 5,483,466 A | 1/1996 | Kawahara et al. | 364/514 |
| 5,487,100 A | 1/1996 | Kane | 379/57 |
| 5,495,234 A | 2/1996 | Capp | 340/825 |
| 5,513,126 A | 4/1996 | Harkins et al. | 364/514 |
| 5,555,346 A | 9/1996 | Gross et al. | 395/51 |
| 5,608,786 A | 3/1997 | Gordon | 379/100 |
| 5,627,764 A | 5/1997 | Schutzman | 364/514 |
| 5,635,918 A | 6/1997 | Tett | 340/825 |

(Continued)

OTHER PUBLICATIONS

E Veripost, "Search Results", 5 pages, Aug. 15, 2001.

(Continued)

*Primary Examiner*—Krisna Lim
*Assistant Examiner*—LaShanya Nash
(74) *Attorney, Agent, or Firm*—George Macdonald; Angelo N. Chaclas

(57) ABSTRACT

A method for determining e-mail address formatting rules corresponding to particular domain names, whereby e-mail address data is collected and sorted based on domains. Based on the gathered data for particular domains, a pattern is identified and an e-mail address formatting rule is determined. Format rule information is stored for future use to assist in correcting and directing e-mail messages so that they may be received by their intended recipients. Gathering of e-mail address data occurs by directly gathering e-mail addresses and e-mail address format data directly from entities responsible for the domain or format are derived based on patterns observed in collected address data for particular domains. Data for developing these patterns may be gathered from e-mail address information resident on the Internet, e-mail address information from e-mail address books, or from public e-mail address listings.

3 Claims, 10 Drawing Sheets

U.S. PATENT DOCUMENTS

| | | | | |
|---|---|---|---|---|
| 5,647,002 | A | 7/1997 | Brunson | 380/49 |
| 5,752,059 | A * | 5/1998 | Holleran et al. | 709/245 |
| 5,822,526 | A | 10/1998 | Waskiewicz | 395/200 |
| 5,844,969 | A | 12/1998 | Goldman et al. | 379/93.24 |
| 5,884,272 | A | 3/1999 | Walker et al. | 705/1 |
| 5,937,161 | A | 8/1999 | Mulligan et al. | 395/200.36 |
| 5,938,725 | A | 8/1999 | Hara | 709/206 |
| 5,944,787 | A | 8/1999 | Zoken | 709/206 |
| 5,961,590 | A | 10/1999 | Mendez et al. | 709/206 |
| 5,968,117 | A * | 10/1999 | Schuetze | 709/206 |
| 5,978,837 | A | 11/1999 | Foladare et al. | 709/207 |
| 5,987,508 | A | 11/1999 | Agraharam et al. | 358/402 |
| 6,035,327 | A | 3/2000 | Buckley et al. | 709/206 |
| 6,049,291 | A | 4/2000 | Kikinis | 340/825.44 |
| 6,088,720 | A | 7/2000 | Berkowitz et al. | 709/206 |
| 6,092,114 | A | 7/2000 | Shaffer et al. | 709/232 |
| 6,138,146 | A | 10/2000 | Moon et al. | 709/206 |
| 6,157,945 | A | 12/2000 | Balma et al. | 709/206 |
| 6,298,341 | B1 * | 10/2001 | Mann et al. | 707/3 |
| 6,427,164 | B1 | 7/2002 | Reilly | 709/206 |
| 6,557,045 | B1 * | 4/2003 | Tsukui et al. | 709/245 |
| 6,654,779 | B1 * | 11/2003 | Tsuei | 718/101 |
| 6,654,789 | B1 | 11/2003 | Bliss et al. | 709/206 |
| 6,829,607 | B1 * | 12/2004 | Tafoya et al. | 707/6 |
| 6,839,738 | B1 * | 1/2005 | Quine et al. | 709/206 |
| 2002/0065891 | A1 * | 5/2002 | Malik | 709/206 |
| 2003/0200265 | A1 * | 10/2003 | Henry | 709/206 |
| 2003/0225850 | A1 * | 12/2003 | Teague | 709/207 |
| 2004/0167969 | A1 * | 8/2004 | Tamai et al. | 709/207 |

OTHER PUBLICATIONS

E Veripost, "Changed Your E-mail Address", 3 pages Aug. 20, 2001.

E Veripost, "Keep in Touch After Gruadation with Veripost", 2 pages, Apr. 30, 2001.

E Veripost, "Have you Changed your E-mail Address", 12 pages, Mar. 30, 2001.

Computermail.net, www.email addresses.com, "Free Email Address Directory", May 10, 2001.

Computermail.net, www.emailaddress.com, "Finding Email Address", May 10, 2001.

Computermail.net, www.emailaddress.com, "Large Email Directories", May 10, 2001.

IMarketing News, iMarketingNews.com/news/article, Jupiter Retailing Forum, ActiveNames Is Latest Victim of Economic Slowdown, May 21-22, Chicago.

ActiveNames™, www.activenames.com, "About Us", Jan. 10, 2001, 24 pages.

Re-route.com, www.re-route.com, Re-route E-mail Forwarding Service, Mar. 12, 2001, 19 pages.

Wall Street Journal, Market Place, E-World, "Many Internet Users Find Themselves Stuck at Their Old Address", by Julia Angwin, Aug. 28, 2000.

Internet Solutions, "Email for Life", "Here's how to keep the same e-mail address through all of life's changes", Sheryl Canter, PC Magazine, Mar. 21, 2000.

The Washington Post, Business, "The Download, The address you leave behind", Shannon Henry, Mar. 15, 2001.

Return Path, "Purelist™ and email list optimization service".

Return Path, "ECOA™ and email change-of-address service".

Return Path, "Seven Techniques to Improve Email List Integrity", Tim Dolan, May 18, 2001.

Opt-innews™, "Return Path Grows To 90 Million Signing Books Brothers, Radisson & Publishers Clearinghouse", May 17, 2001.

ReturnPath, "About Us", Nov. 27, 2001, 11 pages.

ReturnPath, "ECOA Email Change-of-Address".

ReturnPath, ECOA and PureList™, May 17, 2001, 15 pages.

ReturnPath, "SmartBounce™", What is SmartBounce?, Jan. 10, 2001, 7 pages.

Two (2) webpages from www.switchemail.com website printed Nov. 1, 2002.

* cited by examiner

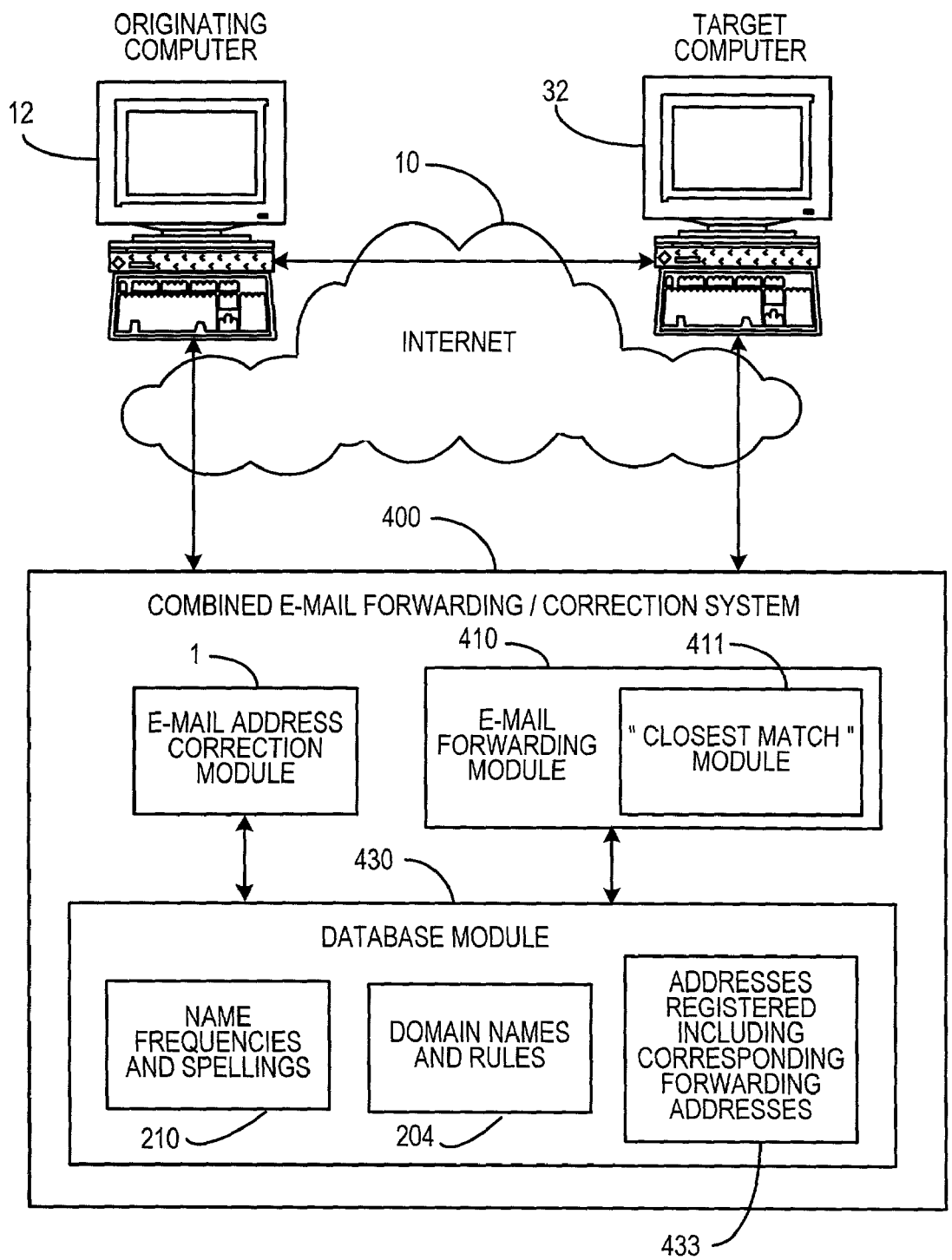

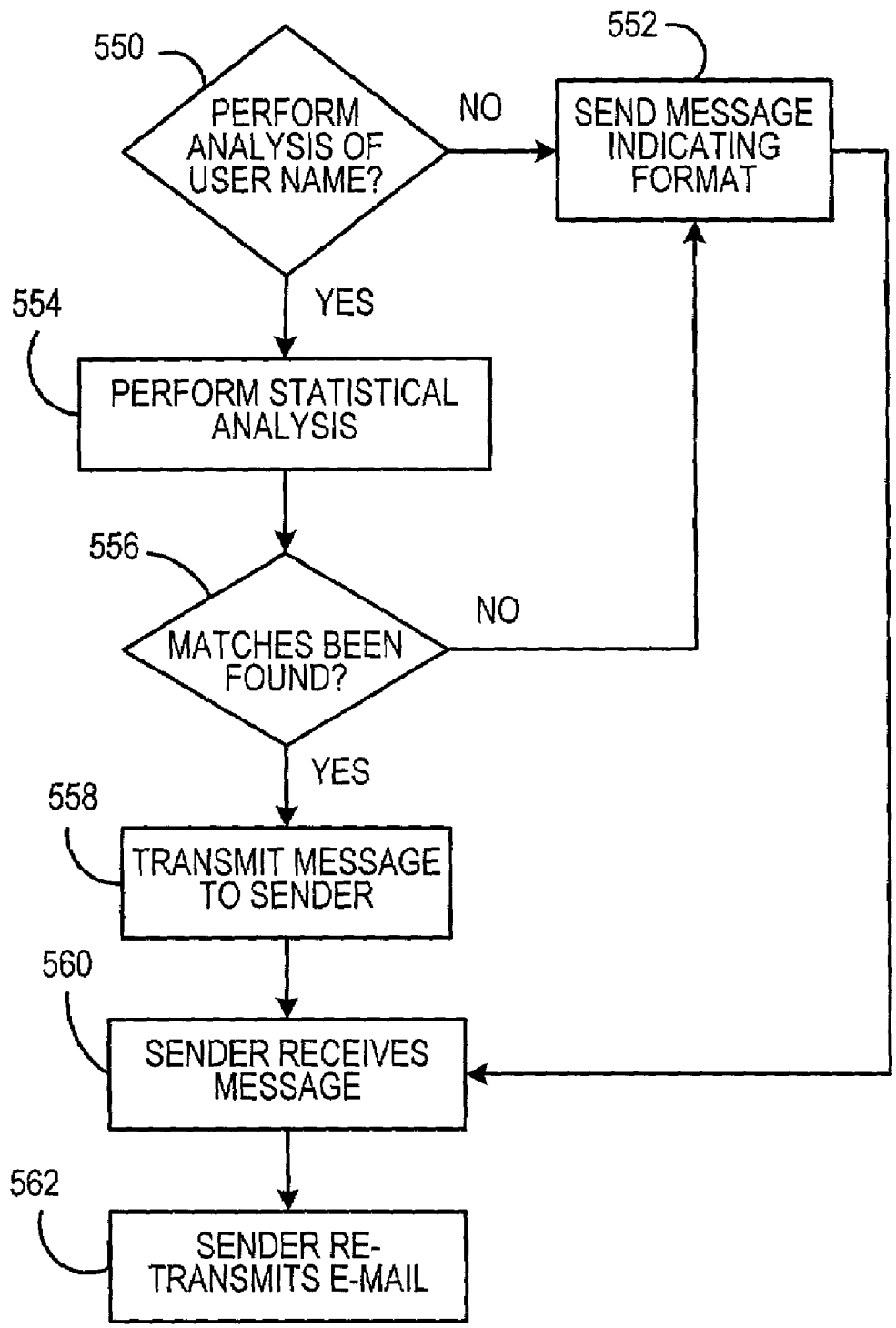

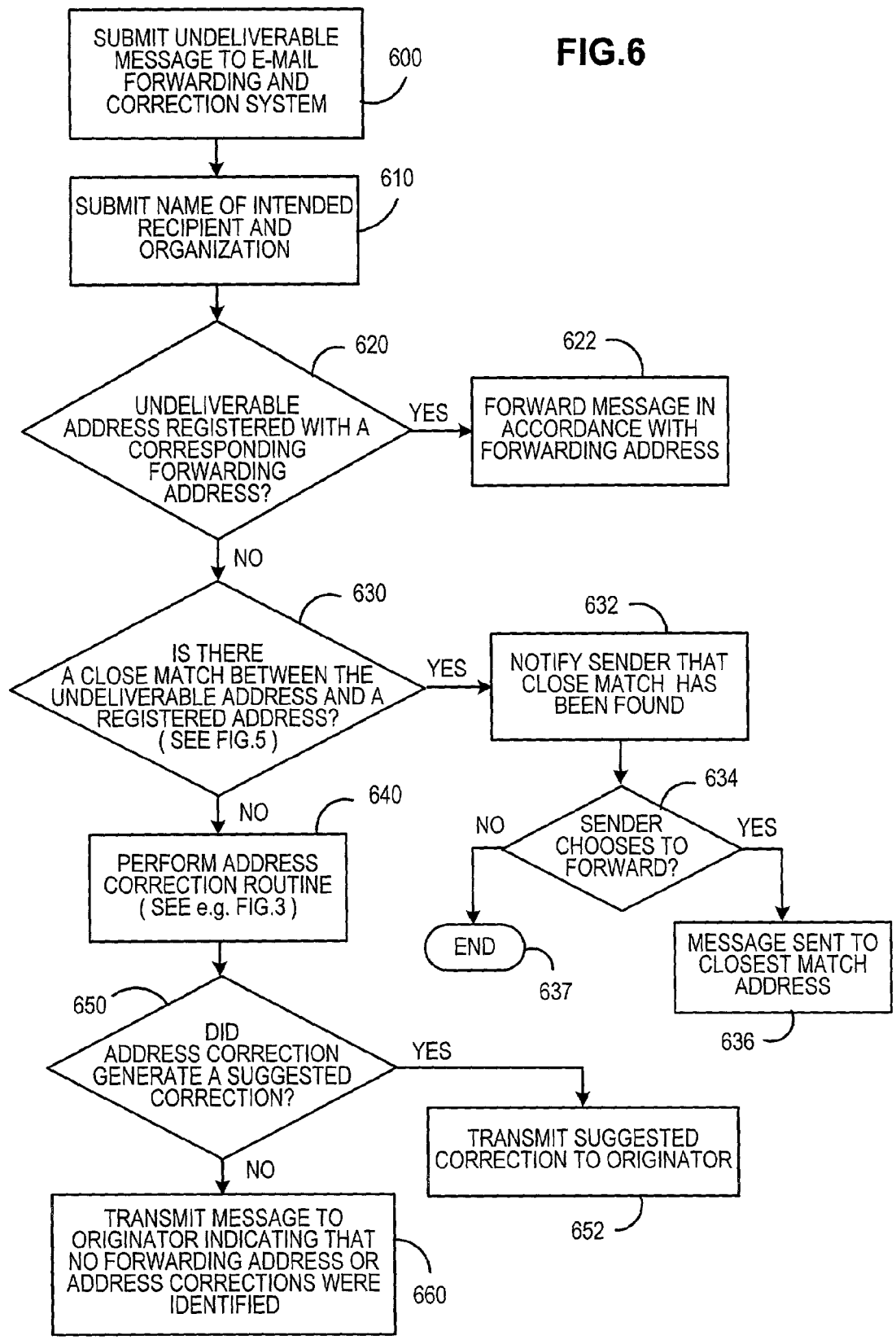

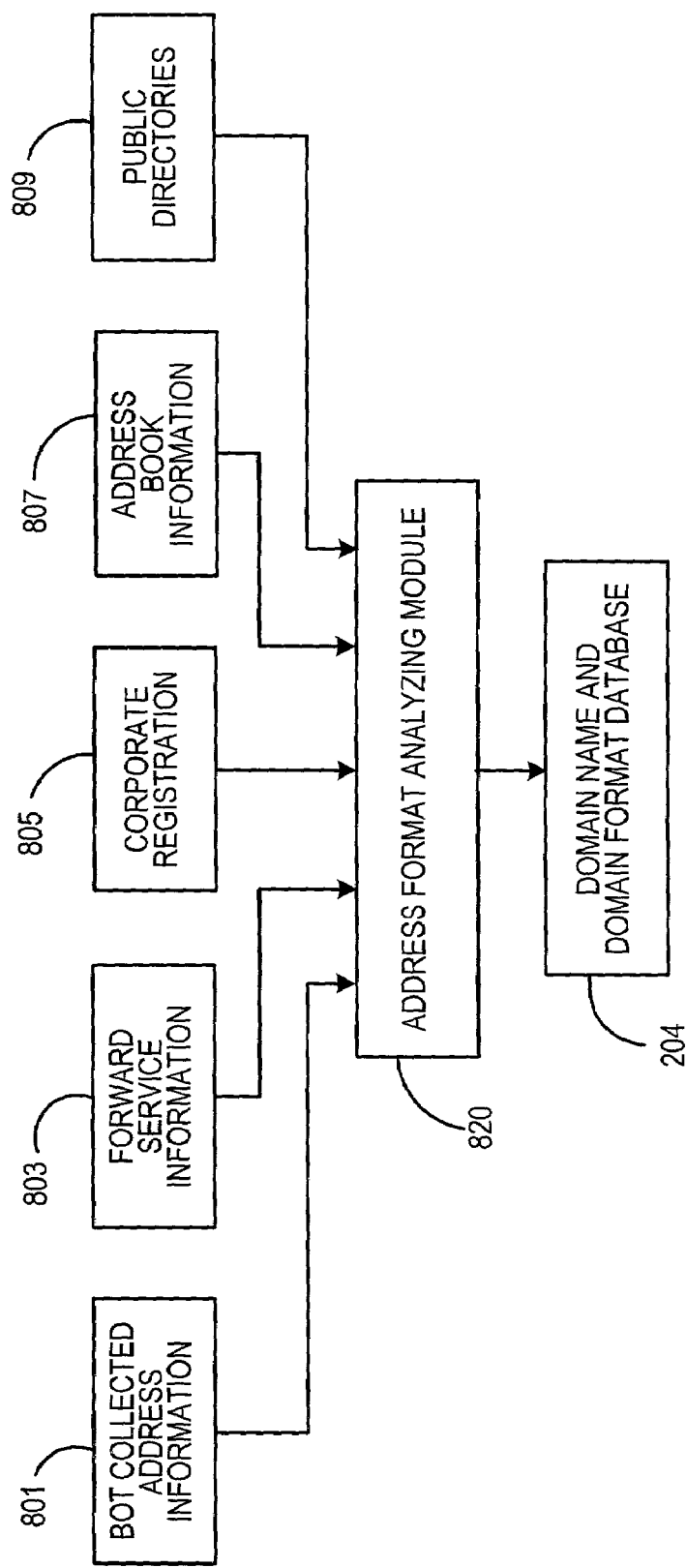

FIG. 9

EXEMPLARY STATISTICAL ANALYSIS FOR DETERMINING CORRESPONDENCE WITH A DOMAIN FORMAT

| EXEMPLARY DOMAIN FORMATS | AOL SAMPLE: POSTNET62@AOL.COM | ARGON CORP. SAMPLE: DOUGLAS.QUINE@ARGON.COM | PITNEY BOWES SAMPLE: QUINEDO@PB.COM |
|---|---|---|---|
| FIRST. LAST | 0% 0% | 100% 100% | 0% 0% |
| LAST. FIRST | 0% 0% | 21% 0% | 0% 0% |
| ALPHANUMERIC | 100% | 0% | 85% |
| LLLLLFF | 42% | 0% | 100% |
| FMLLLLLL | 0% | 0% | 0% |

902 — EXEMPLARY DOMAIN FORMATS
904 — AOL SAMPLE
906 — ARGON CORP. SAMPLE
908 — PITNEY BOWES SAMPLE

METHOD FOR DETERMINING E-MAIL ADDRESS FORMAT RULES

This application is related to the following applications: Ser. No. 09/629,909, titled SYSTEM AND METHOD FOR FORWARDING ELECTRONIC MESSAGES, filed Jul. 31, 2000; Ser. No. 09/629,911, titled DYNAMIC ELECTRONIC FORWARDING SYSTEM, filed Jul. 31, 2000; Ser. No. 09/629,904, titled E-MAIL FORWARDING SYSTEM HAVING ARCHIVAL DATABASE, filed Jul. 31, 2000; Ser. No. 09/648,576, titled REMOTE E-MAIL FORWARDING SYSTEM, filed Aug. 28, 2000; Ser. No. 09/751, 490, titled SYSTEM AND METHOD FOR CLEANSING ADDRESSES FOR ELECTRONIC MESSAGES, filed Dec. 28, 2000; Ser. No. 09/750,952, titled SYSTEM AND METHOD FOR CLEANSING ADDRESSES FOR ELECTRONIC MESSAGES, filed Dec. 28, 2000; Ser. No. 09/920, 059 titled SYSTEM AND METHOD FOR FORWARDING ELECTRONIC MESSAGES, filed Aug. 1, 2001, Ser. No. 09/994,357 titled METHOD FOR PROVIDING ADDRESS CHANGE NOTIFICATION IN AN ELECTRONIC MESSAGE FORWARDING SYSTEM, filed Nov. 26, 2001; Ser. No. 10/017,241 titled SYSTEM AND METHOD FOR ADDRESS CORRECTION OF ELECTRONIC MESSAGES, filed concurrently herewith, and Ser. No. 10/016, 875 titled METHOD FOR DETERMINEING A CORRECT RECIPIENT FOR AN UNDELIVERABLE E-MAIL MESSAGE, filed concurrently herewith. The disclosures for each of the applications listed above are hereby expressly Incorporated by reference.

FIELD OF THE INVENTION

The present invention relates to a system and method for correcting incorrect, or undeliverable, addresses of electronic messages, and more particularly, techniques for determining the appropriate formatting rules for a given address, and steps for processing an undeliverable message to provide a suggestion for a corrected address.

BACKGROUND OF THE INVENTION

Recent advances in telecommunications networks have drastically altered the manner in which people interact and conduct business. These advances promote efficiency and convenience in one's ability to receive important information. With this in mind, individuals and businesses today find that their physical and electronic addresses are changing faster than ever with increased mobility and competing message delivery services. Deregulation and privatization of the global postal systems, competing package delivery services, and rapid growth of multiple competing electronic mail (e-mail) systems are creating an environment in which there is no single point of contact for address correction as there was when the sole messaging provider was the national postal service.

Users who enjoy the benefit of sending and receiving e-mail messages typically subscribe to an Internet Service Provider (ISP) offering such e-mail capabilities (e.g., America Online (AOL), Netcom, and Redconnect) and/or may subscribe to an internet based e-mail service (e.g., juno, rocketmail, yahoo) which each is associated with a particular e-mail address. Thus, the email address is unique to the e-mail service provider. The uniqueness of an address to a selected provider is recognizable on the face of the address, e.g., DQuine@aol.com, Quine@juno.com or DougQuine@yahoo.com. In addition to ISP's, e-mail addresses are often provided to employees and members of organizations such as businesses, educational institutions, clubs, and government entities. Such e-mail addresses usually comprise a domain name, such as "pb.com," "uconn-.edu," or "uspto.gov," to the right of the @ symbol. To the left of the @ symbol is a set of characters that identifies a particular e-mail account within the e-mail service of the domain.

Most e-mail providers have rules for the format of e-mail addresses. For example, most have a limit on the number of characters. As another example, AOL does not currently allow e-mail addresses with periods, while other providers do allow that kind of punctuation. For some e-mail providers, the content of the e-mail address to the left of the @ symbol is determined as a function of the name of the intended recipient of e-mail messages at that address. For example, an e-mail address for Douglas Quine at Pitney Bowes Inc. could be quinedo@pb.com, following a rule designating the e-mail address as the first five letters of the last name plus the first two letters of the first name. In many organizations such as businesses, it is common for an e-mail address to be a function of the recipients' names, for other types of e-mail providers, such as ISP's an e-mail address can be any combination of alphanumeric characters (governed by some spacing and punctuation rules).

A problem arises when someone who wants to send an e-mail message does not know the correct e-mail address of the intended recipient. An example being the situation when a sender wants to send an e-mail to Doug Quine, and the senders knows that Doug Quine works at Pitney Bowes and that he has an e-mail address at Pitney Bowes but does not know the precise e-mail address but nevertheless wants to send an e-mail to Doug Quine at Pitney Bowes. Thus the sender then goes ahead and transmits an e-mail to Doug Quine using an educated guess that Doug Quine's e-mail address is Douglas.Quine@pb.com (when it actually is quinedo@pb.com). Unlike a postal delivery person delivering regular mail, conventional e-mail systems are very strict in requiring that an exact match be made for delivering a message to a message to an e-mail address. If an e-mail address is imprecise, even if only by one character, the message will not be correctly delivered. Accordingly, the sender attempting to send the message to Douglas.Quine@pb.com will be likely to receive a message from the MAIL DAEMON for the Pitney Bowes e-mail server telling him that the message he sent is undeliverable.

Exacerbating the problem is the widespread practice of switching from one e-mail address to another, abandoning the former address in the process. A user or subscriber to a particular e-mail service may from time to time desire or need to change service providers (e.g., from DQuine@aol.com to QuineDo@pb.com). Exemplary motivation for these changes may derive from the fact that an alternative service provider charges lower rates, or the existing provider's inability to upgrade its service.

There are any number of other reasons for an e-mail addressee to change addresses. Changes in e-mail addresses may be the result of changing employment, where different employers provide different e-mail accounts for their respective employees. Even if an employee does not change employer, a new assignment or a new location can result in a new e-mail address. Some e-mail addressees may change their name (for example, as a result getting married), and want a new e-mail address to reflect that name change.

A user who desires to change from one e-mail service provider to another suddenly faces the reality of being bound to the old service provider because the user's address is unique to that one provider. A sudden and complete changeover is in many circumstances impossible because the community of people who wish to send electronic messages to the user are only aware that the old address exists. For example, an e-mail address may be published in an industry directory that is only published once every year or two years. Alternatively, the e-mail address may be printed on a business card which cannot be retracted and corrected. Thus, the user incurs a potentially significant loss of prospective business by abandoning the old address.

Currently, there is no effective means for address correction of e-mail addresses. Even if the e-mail sender is highly diligent, there are no resources or processes available to identify incorrect electronic address information, and for suggesting corrected electronic address information. The problem is further accentuated by the fact that extreme competition in internet service providers, and likewise e-mail service providers, results in extremely high obsolescence of e-mail addresses with no means for e-mail forwarding (e.g., closing an AOL e-mail account provides no option for forwarding e-mail intended for that account to a new e-mail address). Often, even when an address is changed within the same ISP, there is no mechanism to forward messages to the current address.

E-mail addresses also become obsolete as a result of changes to business e-mail domain names. An e-mail domain name change may occur for a variety of reasons including mergers and acquisitions of companies, rebranding, or corporate or divisional name changes. In addition to changing domain names, companies may also revise the address name formats, adding further difficulty to proper delivery of e-mail messages.

SUMMARY OF THE INVENTION

To address the shortcomings of existing e-mail systems, and to provide the ability to analyze and correct e-mail addressing errors, the present invention provides a method for determining e-mail address formatting rules corresponding to particular domain names. To perform the method of the present invention, e-mail address data is collected and sorted based on domains. Based on the gathered data for particular domains, a pattern is identified and an e-mail address formatting rule is determined. Once the e-mail address formatting rules are determined for a particular domain, the information is stored for future use to assist in correcting and directing e-mail messages so that they may be received by their intended recipients.

In one preferred embodiment, the gathering of e-mail address data occurs by directly gathering e-mail addresses and e-mail address format data directly from entities responsible for the domain. Such entities may register their domain in conjunction with the present invention in order to take advantage of, and to enhance, the address correction functionality of the present invention. The present invention may also be used in conjunction with an e-mail forwarding service. Registration of e-mail addresses for such an e-mail forwarding service may also serve for gathering of e-mail address data.

In another preferred embodiment of the invention, format information for domains is not collected directly but is derived based on patterns observed in collected address data for particular domains. Data for developing these patterns may be gathered from e-mail address information resident on the Internet, e-mail address information from e-mail address books, or from public e-mail address listings.

In identifying patterns that indicate rules corresponding to domain names, statistical techniques are used to compare addresses with many different known address formats. Based on the frequency at which addresses for a particular domain are found to be consistent with particular known formats, a pattern can be derived and rules for the domain may be inferred.

In a preferred embodiment, for analyzing whether an address is consistent with name based formatting rules, the addresses are compared to lists of known names. The frequency of the occurrence of such names in the general population may also be used to determine a degree of confidence for whether an address is consistent with a particular format.

The present invention may also use information external to the gathered e-mail address data. For example, information about a name of a person associated with an address may be downloaded from an address book. That information may be used, where appropriate, to determine whether requirements appear to have been satisfied. For example, if address format is dependent of the recipient's name, then information about the name from the address book can be compared to the address.

Further detailed embodiments of the present invention will be apparent from the figures, the detailed description, and the claims provided below.

DETAILED DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which:

FIG. 4 depicts an exemplary e-mail forwarding and e-mail address correction system;

FIGS. 5A and 5B depict a flowchart for an e-mail forwarding system incorporating "closest match" capability;

FIG. 6 depicts a flowchart for an e-mail forwarding and e-mail address correction system;

FIG. 8 depicts a flow of information for generating a domain name and domain format database; and FIG. 9 is a table providing an exemplary statistical analysis for determining a domain format in accordance with the present invention.

DETAILED DESCRIPTION OF THE PREFERRED EMBODIMENTS

Figure 1:
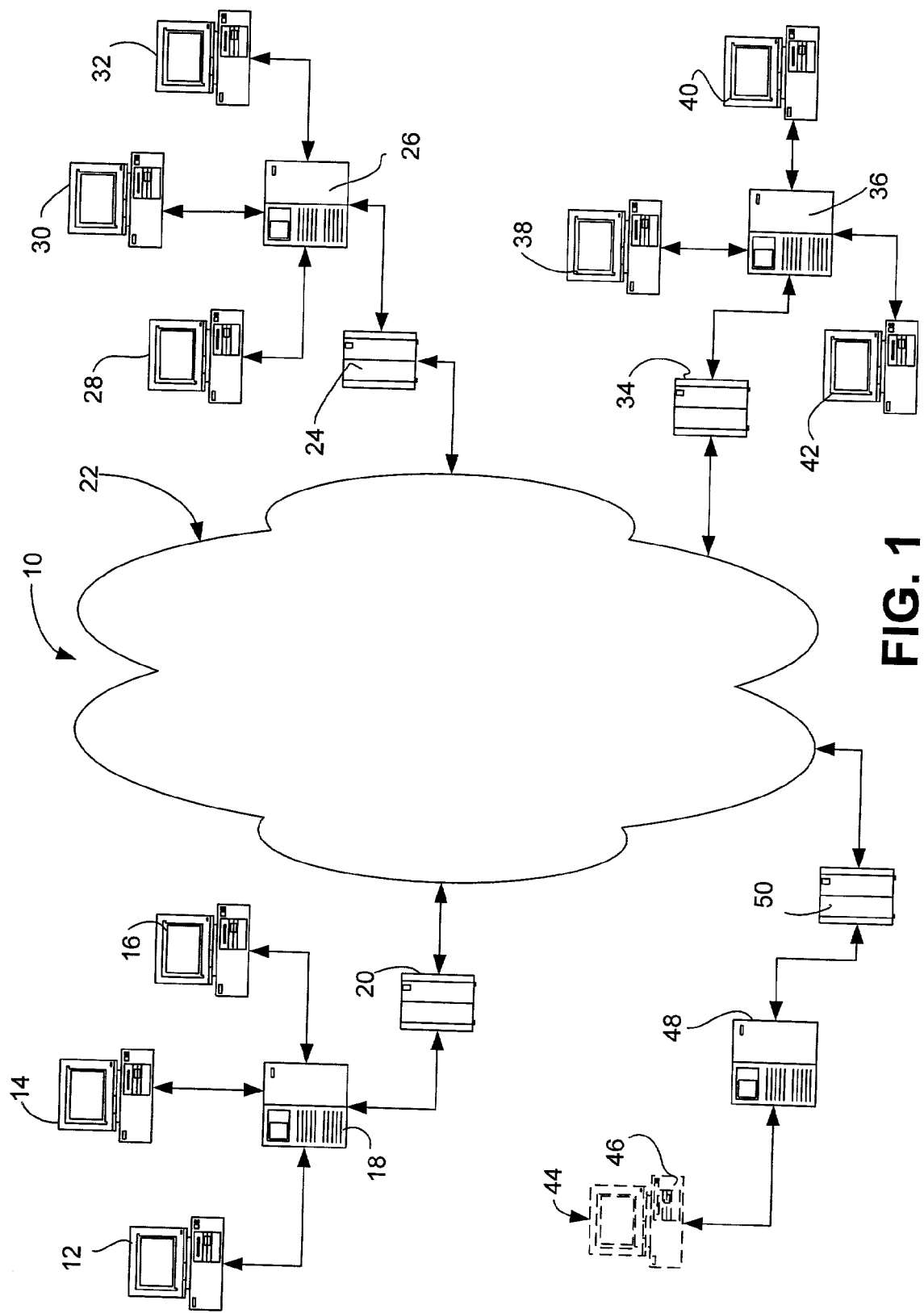
FIG. 1 depicts an electronic e-mail messaging system embodying the present invention.

In the preferred embodiment, address correction according to the present invention may be carried out on the INTERNET. FIG. 1 schematically depicts a conventional INTERNET telecommunications system 10. The FIG. 1 system is exemplary in nature. The present invention can be implemented as program control features on substantially all telecommunications service provider systems, and system 10 is intended to represent any operable telecommunications system that is used by any telecommunications service provider in conducting communication operations (e.g., facsimile, pager, mobile phone and PDA computers).

It is to be appreciated that the term "INTERNET" is well known in the art as designating a specific global international computer network that operates according to the TCP-IP protocol. A portion of the INTERNET receives or has in the past received funding from various United States governmental agencies including ARPA, NSF, NASA, and DOE. INTERNET communications protocols are promulgated by the Internet Engineering Task Force, according to standards that are currently set forth in RFC 1602.

Telecommunications system 10 includes a plurality of user or signal origination sites 12, 14 and 16, with each site being depicted in reference to a PC capable of generating and transmitting e-mail messages, wherein each site 12, 14 and 16 corresponds to a specific telecommunications address. A user may utilize one site or a plurality of sites. A single city or local service area may have millions of these signal origination sites. Each site 12, 14 and 16 corresponds to a telecommunication address that belongs to an individual, business, and other entity having need to avail themselves of telecommunications services.

It is to be understood that preferably each origination site 12, 14 and 16 feeds its signal (addressed to a subscriber identified at a selected service provider) to an internet service provider 18 (ISP), which in turn preferably feeds the signal to a local router node 20 that directs the local signal to a relay system, e.g., the INTERNET (conventionally depicted as a cloud) 22, which transmits the signal to a router 24 through a series of relays. The signal eventually arrives at an internet service provider 26 through router 24.

As can be seen in FIG. 1, a plurality of destination sites 28, 30, 32, 38, 40 and 42 are shown connected to internet service providers 26 and 36 with each site being depicted in reference to a PC capable of generating and transmitting e-mail messages, wherein each site corresponds to a specific telecommunications address. It is of course to be appreciated that telecommunications system 10 includes a plurality of routers (e.g., routers 24 and 34 with each internet service provider being connected to a plurality of user sites (e.g., PC's 38, 40 and 42). It should also be appreciated that internet service providers 18, 26, 36, and 48 may be a consumer subscription oriented ISPs, such as AOL, or an institutional e-mail communication service provided by a company to provide e-mail for employees.

In accordance with one implementation of the present invention, telecommunications system 10 additionally includes a messaging forwarding system 44, which enables e-mail messages to be automatically forwarded to a forwarding address, which forwarding address is associated with a currently undeliverable e-mail address. Messaging forwarding system 44 preferably includes a PC 46 connected to an internet service provider 48, which PC 46 is provided with a unique e-mail address (corrections@emailangel.com) and software programmed to perform the below described steps necessary to operate the present invention e-mail forwarding system 44. PC 46 may have more than one unique e-mail address. The different addresses may connect to varying forwarding service that can be provided by forwarding system 44, and to receive different formats of submissions to forwarding system 44. Internet service provider 48 is preferably connected to INTERNET 22 via router 50. It will be understood by those skilled in the art that message forwarding system 44 may include any suitable computer processing device as an alternative to PC 46.

FIG. 1 is exemplary in nature, and those skilled in the art understand that equivalent substitutions of system components can be made. For example, electrical communications over conductive telephone lines, optical communications over optical fibers, radio communications, and microwave communications are substantially equivalent for purposes of the invention. Likewise, messages could be relayed through e-mail, facsimile, pager, PDA device or other capable communications system. For the purposes of this invention "e-mail messages" can refer to messaging such as "instant messaging" and other electronic messaging appliances that may be transmitted using radio waves, the INTERNET, networks, or telephone systems to carry information based on electronic addresses.

In addition to being implemented on the INTERNET 22, the present invention may be implemented on any network of computers. Further, embodiments of the invention may also be useful on stand-alone computers.

Figure 2:
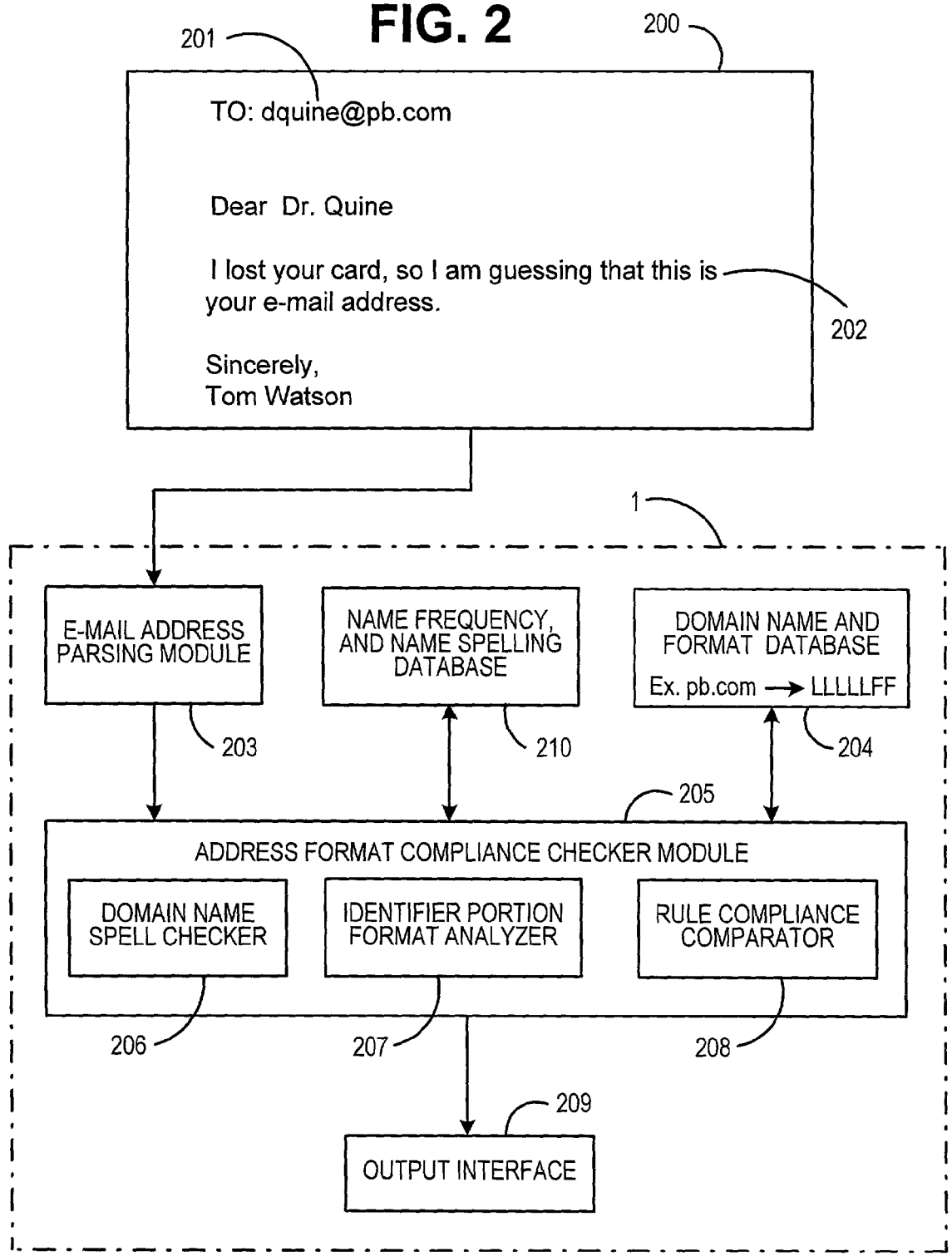
FIG. 2 depicts an exemplary system for performing e-mail address correction.

FIG. 2 depicts an aspect of the present invention for providing a corrected e-mail address for an e-mail message that is undeliverable because it contains an incorrect e-mail address. Such a system as depicted in FIG. 2 may be present in an e-mail forwarding computer 44, or a general purpose PC 12. The system operates on an e-mail message 200 that includes an e-mail address 201 and message text 202. In the example shown, the message is addressed to dquine@pb.com. As indicated in the text 202 of the message 200, the sender has reason to suspect that the e-mail address 201 may not be correct.

In accordance with the present invention, the message 200 is submitted to an e-mail address correction module 1, which includes a number of sub-modules for checking the accuracy and correctness of the e-mail address 201. The sub-modules shown in FIG. 2 are distinguished for purposes of explaining the present invention, however, they need not be controlled by separate processors or by separate software programs. Rather, functionality may be shared between the various sub-modules.

Within the e-mail address correction module, the message 200 is received by an e-mail address parsing module 203 that can separate the e-mail address 201 from the rest of the message 200. The address parsing module 203 may also distinguish the domain portion of the e-mail address 201, after the "@" symbol, from the unique identifier portion of the e-mail address, before the "@" symbol. The address parsing module 203 may further distinguish portions of the identifier portion of the address 201 as separate words separated by punctuation delimiters, such as a period or hyphen. The separated words may be spell-checked against dictionary or name lists.

The parsed e-mail address is then passed along to the address format compliance checker module 205. As shown in FIG. 2, the address format compliance checker 205 receives information from two databases, the domain name and domain format database 204, and the name frequency and name spelling database 210. The domain database 204 includes a listing of known e-mail domains and the address format rules corresponding to those domains. The domain database 204 may be populated, at least in part, by domain owners registering the formats for their respective e-mail systems to enhance the effectiveness of the invention described in this application. The information from the domain database 204 can be used to determine whether an e-mail address 201 is using the correct format. Because many e-mail domains use formats that are a function of the name of a person who will receive the e-mail at that address, the name frequency and name spelling database 210 is included to analyze the e-mail address to determine whether it is consistent with name related formatting rules. The name database 210 is also useful for statistical analysis to determine format rules for particular domain names. Name database 210 may populated, for example, by information from national telephone books published on CD, books and lists which offer suggestions for names, or genealogy references that provide extensive information about last names.

The address format compliance checker module 205 uses the information in databases 204 and 210 to determine whether the e-mail address in question is inconsistent with known e-mail address format rules corresponding to the addresses' domain.

The checker module 205 also includes a domain name spell checker 206. The domain name spell checker 206 examines the domain portion and determines whether there may be an error. For example, the domain name spell checker 206 may look at whether suffix portion of the domain (the portion after the ".") complies with currently allowable top level domains. For example if an e-mail address included a domain with ".con" in it, it would be recognized that ".con" is not a currently usable top level domain. The domain name spell checker 206 then may suggest an alternate spelling that conforms to current rules. Thus, in the current example an alternative spelling including ".com" would be suggested. In addition, the domain name spell checker 206 could compare the domain name to spellings for known domains. Thus, for example, if the address included "pitneybows.com," the checker could suggest "pitneybowes.com" as an alternative spelling.

The checker module 205 further includes an identifier portion format analyzer 207. This component examines the content of the identifier portion of the e-mail address to determine whether it contains a name, or other distinguishable information. In particular the identifier analyzer 207 considers sections of the identifier portion that are separated by any punctuation delimiters to identify if there are names, and, if so, whether the names are first names or last names. The analyzer 207 may also include a spell checking functionality that will offer alternative spellings for what appear to be misspelled names. For example, if the address was "dougls.quine@pb.com," the analyzer could determine that "dougls" might be a misspelling of the common first name "douglas." Referring to the name database 210, the analyzer 207 may also recognize that "quine" is a last name, and that the example address appears to be using a "first.last" format. The identifier portion format analyzer 207 refers to the name database 210 to determine whether the identifier portion includes a string of characters which may be consistent with a persons name. The analyzer 207 may also examine the number and types of characters in the address for future reference against format requirements.

While punctuation is a convenient way to delimit the boundary between first and last names for some e-mail address formats, the presence of such punctuation is not necessary for the present invention. Using techniques described later in this application, an address can be analyzed for compliance with a format rule that combines a predetermined number of characters from a recipient's first and last names. For example, an address like "quinedo@pb.com" can be determined to be consistent with a rule allowing the first five letters of a last name ("quine"), and the first two letters of a first name ("douglas"). Such a rule is written in short hand as "LLLLLFF." The "quinedo" example, may also be found to be consistent with a rule using the first six letters of the last name, but the name "quine" does not use the sixth character since it is only five characters long.

Analyzer 207 may also test for the presence of middle initials in the e-mail address. In the "quinedo" example, the letter "o" could be a middle initial instead of the second letter to a first name (making it consistent with LLLLLFM format). However, referring to name database 210, based on the statistical frequency of the letter "o" as a middle initial, it may be found that "do" is more likely to represent the first two letters of a first name. If the character were "x" instead of "o," then it may be found that the "x" is more likely to be a middle initial, since it is unlikely that a first name has the first two letters "dx."

The checker module also includes a rule compliance comparator 208. If an e-mail address format rule corresponding to the domain of the e-mail address 201 is found in the domain database 204, then the rule compliance comparator 208 determines whether the identifier portion of the e-mail address is consistent with the format rule. This determination may be done by comparing the format required by the rule with a format for the identifier portion as determined by the identifier portion format analyzer 207. Thus, if it were determined that the domain "pb.com" used an e-mail address rule which used the first six letters of the last name and the first two letters of the first name (or LLLLLLFF in short-form), then that rule would be compared against the identifier portion as analyzed by analyzer module 207. Based on information known about last names, the checker module 205 can determine that it is unlikely that the initial characters in "dquine" are the initial letters in any known last name. As such, it is determined that that the address 201 does not comply with the required rule. The checker module may further recognize that the characters "quine" can be a known last name, and a suggested correction might take that information into account.

Based on its analysis of the e-mail address, the address format compliance checker 205 may provide several different outputs via output interface 209. First, the checker module 205 may provide a suggested format for the e-mail address if a rule has been identified for the particular domain, or if the domain has been found contain an error. Along with the suggested format, module 205 may provide an indication of whether the address appears to be consistent with the identified rule, and specific changes may be suggested. Module 205 may also provide suggested alternative spellings to the user for the domain portion of the address.

Figure 3:
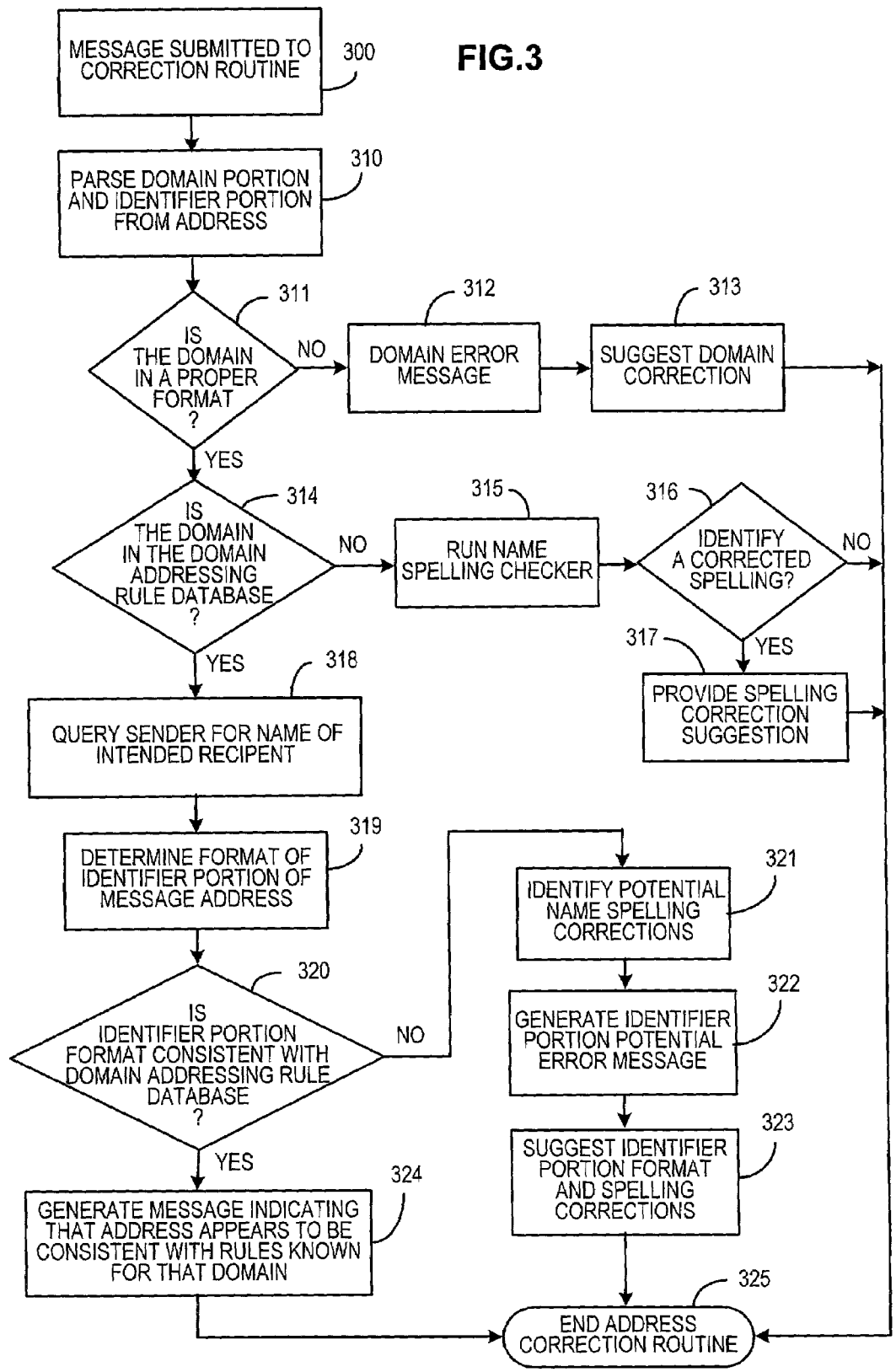
FIG. 3 depicts a flowchart for an e-mail address correction routine.

FIG. 3 depicts a flow process for performing address correction which may be implemented in a system such as that depicted in FIG. 2, or by any appropriate arrangement of software. At the beginning of the process (step 300), a message is submitted to the address correction routine. For the purpose of the address correction routine, the source of the message does not matter. In one embodiment, the address correction routine may be part of an e-mail forwarding service and the message may have been previously found to be undeliverable.

In another embodiment, the address correction routine may be performed on the message before an initial attempt to send the message. The requisite software and data may be resident on a user's personal computer, such as PC 12, and the address correction routine may be invoked as desired for any outgoing message. Alternatively, the correction routine may be implemented by an e-mail server servicing a group of e-mail addresses, or by an ISP, to improve quality of outgoing e-mail.

Once a message has been submitted to the address correction routine, the domain portion of the e-mail address and the identifier portion of the e-mail address are identified and parsed, at step 310, in preparation for further processing.

At step 311, the routine determines whether the domain portion is in a proper format. As in a previous example, it is possible that an improper top level domain, such as ".con," may be present. The domain may also include improper characters such as slashes, or multiple periods, which may not be allowed under current domain formulation rules. If the domain is not in proper format, a domain error message is generated at step 312, to inform a user that there appears to be a problem with the domain portion. Further, at step 313, using spell checking techniques the routine may provide suggested domain corrections, such as changing ".con" to ".com."

If there are no apparent errors with the domain portion of the address, then at step 314, the routine determines whether the identified domain is in the domain addressing rule database. The domain addressing rule database includes a listing of domains for which the e-mail address formatting rules are known. If the addressing rules for the domain are not known, then the address is spell-checked at step 315. The spelling check uses convention spell-checking techniques to compare the address to known names and words to determine whether an alternative spelling may be appropriate. The spelling check takes into consideration delimiting punctuation in separating out portions of the address which may form known words, person names, company names, or domain names. At step 316 it is determined whether a corrected spelling has been identified, and, if so, a spelling correction suggestion is provided at step 317.

For the purpose of providing an alternative domain spelling at steps 315–317, in addition to examining the domain portion of the address, it may also be helpful to consider the identifier portion to determine whether a suggested correction is consistent with a format rule for the suggested correction. For example, it is a known AOL e-mail format rule that only alphanumeric characters are allowed. Thus, if an address under consideration were "doug2001@alo.com," a correction from "alo.com" to "aol.com" would be consistent with the rest of the address. However, if the address were "john.smith@alo.com," the inclusion of the punctuation (disallowed by AOL) would be inconsistent with a correction of "alo.com" to "aol.com."

If it is determined at step 314 that a format rule is known for the domain in question, then it may be useful to attempt to gather further information beyond the mere address, to determine whether that rule has been complied with. For example, if the rule is a name-based rule then it could be determined with more confidence whether that rule was being properly followed if the name of the intended recipient were known. Accordingly, at step 318, the routine may seek such further information, and in particular may seek the name of the intended recipient. Such information gathering may be acquired by sending an inquiry to the original message sender, as in step 318. Alternatively, the information may be gathered prior to beginning the correction routine. The routine may also examine the contents of the message to determine information about the intended recipient. For example, if the message says "Dear Dr. Quine," then the significance of the characters "quine" will become more certain as a last name. Similarly, if the message says "Dear Douglas," the presence of characters from that name, or related names like "Doug," in the e-mail address suggests that a first name is incorporated into the e-mail address. Such information thus provides more certainty as to whether a name-based rule has been complied with.

For purposes of comparison against the identified format rule, at step 319 the identifier portion of the address in question is examined to determine something about what format, if any, it may exhibit. The identifier portion may be compared with the information gathered in step 318, or against a database 210 of known names. The inclusion of numerals, punctuation, or other types of characters may also be noted, since various format rules may require or disallow some types of characters. Similarly, since some formats have maximum and/or minimum number of character requirements, the number of characters in the identifier portion of the address may be noted. Another exemplary format may require that the identifier portion of the address be in the form of a phone number.

In step 320, the e-mail address identifier portion, as analyzed in step 319, is compared with the domain addressing rule derived from the domain addressing rule database. Thus, it is determined whether the identifier portion of the e-mail address is consistent with the identified rule. In some cases the determination will be certain. If the rule states that no punctuation is allowed in the identifier portion, and the address includes such punctuation, then it will be clear that the address is inconsistent with the rule. However, in other cases, the determination of step 320 will not produce a certain result. For example, unusual names or names that can be both first names and last names can create uncertainty, especially if additional information has not been acquired in step 318. Accordingly, a determination of whether an address is consistent with a rule may be a matter of degree, and this degree will be retained and used for future processing.

If it has been determined that the identifier portion is inconsistent with the format rule, or if there is a low probability of being consistent, then the routine may run a spelling check on the identifier portion of the address to determine if there are any potential misspellings of words or names (step 321). At step 322, the routine may also generate a message indicating that a potential error has occurred in the format of the identifier portion of the address. At step 323, such a message may also identify the proper e-mail message format, as previously identified for the domain, and any suggested corrections based on available information may be provided. For example, if the name of the intended recipient can be determined, and if the formatting rule is name dependent, then a suggested corrected e-mail address can be provided.

If no inconsistencies are identified, or if there is a high probability that the address is consistent with the rule, a message may be generated indicated that the message appears to be in a proper format, as shown in step 324. Step 324, may further indicate the appropriate address format, as previously identified, so that the user may further verify that address is written as intended. After these steps, the routine is finished at step 325.

As previously mentioned, the address correction module 1, as described above, may be used in connection with an e-mail forwarding service 44. Such a combination provides a range of functionality to help an undeliverable e-mail message reach its intended recipient. FIG. 4 depicts an embodiment of the present invention for delivering a message from an originating computer 12 to a target computer 32.

In the embodiment depicted in FIG. 4, the target computer 32 is programmed to receive e-mail messages directed to a target e-mail address. The user of the originating computer 12 wishes to send a message to the user of the target computer 32, but for some reason the message is not getting through.

As such, the originating computer 12 can forward the undeliverable message to the combined e-mail forwarding and correction system 400, as shown in FIG. 4. Combined system 400 includes an e-mail address correction module 1 and address correction routine as described previously in relation to FIGS. 2 and 3. The combined system 400 also includes an e-mail forwarding module 410, which is preferably a system such as described in co-pending patent application Ser. No. 09/920,059 titled SYSTEM AND METHOD FOR FORWARDING ELECTRONIC MESSAGES, filed Aug. 1, 2001, incorporated by reference.

The e-mail address correction module 1 and the e-mail forwarding module 410 both utilize data relevant to e-mail addresses which may be shared in the form of a combined database module 430. The database module 430 may include the name frequency and spelling data 210 and domain names and rules 204, as described in connection with address correction module 1. The database module 410 may also include a database of e-mail addresses and forwarding e-mail addresses registered in connection with the e-mail forwarding module 410. The data 204, 210, and 433 may also be used together advantageously to further enhance the accuracy of the system, as described in more detail below.

The e-mail forwarding module 410 may include a sub-module for performing a kind of address correction which is specifically targeted to a system that incorporates an extensive list of known e-mail addresses associated with a given domain. For example, a corporate registrant of an e-mail forwarding service may provide the service with a comprehensive list of e-mail addresses for e-mail recipients at a domain controlled by the corporate registrant. The closest match sub-module 411 uses a process to determine if an undeliverable e-mail address may be a variant or misspelling of an existing registered e-mail address for that domain. Such a process as used by the closest match module 411 is described in reference to FIGS. 5A and 5B.

An example where the closest match module 411 may be useful is a situation where a sender wants to send an e-mail to Doug Quine, and the senders knows that Doug Quine works at Pitney Bowes and that he has an e-mail address at Pitney Bowes but does not know the precise e-mail address but nevertheless wants to send an e-mail to Doug Quine at Pitney Bowes. Thus the sender then goes ahead and transmits an e-mail to Doug Quine using an educated guess that Doug Quine's e-mail address is Douglas.Quine@pb.com (when it actually is quinedo@pb.com). Also in this example, Pitney Bowes has registered all of its e-mail addresses with combined system 400. In one embodiment described below, when the sender transmits the e-mail to Doug.Quine@pb.com, the messaging forwarding module 410 with closest match module 411 is able to suggest sending the e-mail to quinedo@pb.com.

In reference to FIGS. 5A and 5B, the method of operation will now be described. First, when an email originator computer 12 desires to transmit a message to a target computer 32 having either what is thought as a known e-mail address, or an educated guess of the recipient's e-mail address (e.g., Douglas.Quine@pb.com) as described above, the originator 12 nevertheless transmits the e-mail message through conventional e-mail protocol, whereby the message is delivered to the identified domain name mail server 26 (e.g., pb.com) specified in the recipient's e-mail address (e.g., Douglas.quine@pb.com), via the senders ISP server 18 (step 500). The specified domain name mail server 26 then receives the e-mail message (step 502), and if the e-mail account is not recognized by the domain name mail server 26 (e.g., Douglas.quine@pb.com) (step 504), then the specified domain name mail server 26 rejects the request and sends an undeliverable message (e.g., a MAIL-DAEMON message) back to the originator 12, via the originator's e-mail server 18 indicating that the message is not deliverable (step 510). The originator's e-mail server 18 then sends the message to the originator 12 that the attached e-mail message is undeliverable.

Figure 5A:
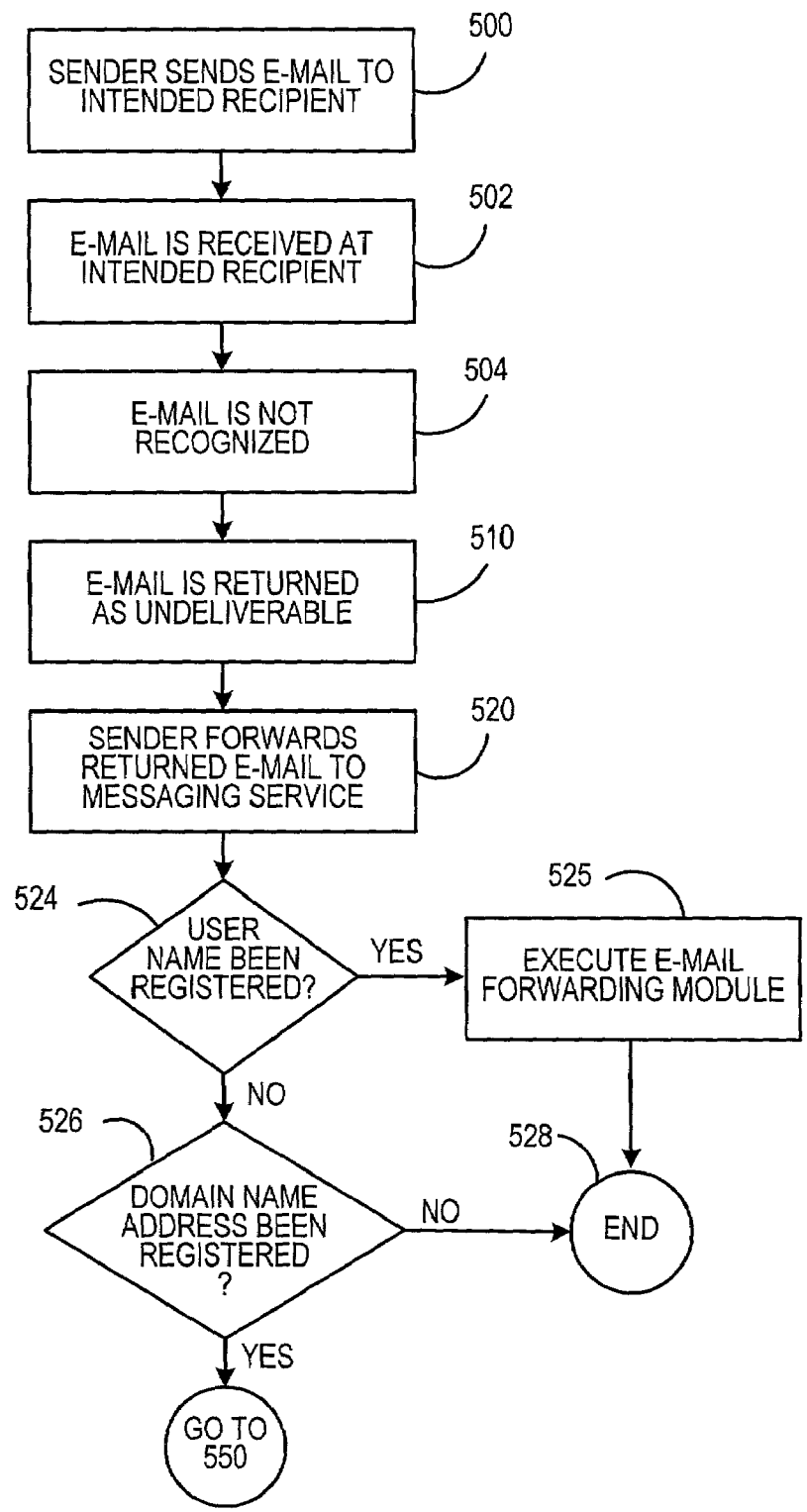

With continuing reference to FIG. 5A, since the originator 12 was unsuccessful in delivering the e-mail message to the recipient, the sender then forwards the e-mail message to the combined e-mail forwarding and correction system 400 of the present invention (step 520). The message forwarding and correction system 400 then receives the forwarded e-mail message (step 522) and determines if a forwarding address has been registered for the undeliverable forwarded e-mail message (step 524). If yes, then the e-mail is forwarded as appropriate (step 525). If no, a determination is then made as to whether the domain name address (e.g., pb.com) of the undeliverable e-mail address (e.g. Douglas.quine@pb.com) has been registered with the e-mail forwarding and correction system 400 (step 526). If no, then system 400 then preferably sends a message back to the originator that it is unable to provide a forwarding e-mail address for the undeliverable e-mail address (step 528). System 400 may also offer to hold a copy of the mail in the event that the intended recipient become known by the system 400 in the future.

If yes, and with reference now to FIG. 5B, a determination is made as to whether an analysis to determine a "closest match" is to be performed (step 550). As will be described further below, this "closest match" determination is essentially the performance of an analysis to find the closest match to the username (e.g., douglas.quine) of the undeliverable e-mail in comparison to those usernames that are pre-registered with the system 400 in association with the subject domain name address (e.g., pb.com). Preferably, and as further described below, when the administrator of the mail server 26 opens an account with the e-mail forwarding and correction system 400, the administrator decides whether to list all current usernames associated with the subject domain name address (e.g. pb.com) so as to enable the performance of the closest match determination. If no "closest match" determination is to be performed (e.g., either the administrator of the subject domain name address has decided not to list all associated usernames, or has decided not to enable this feature in the messaging system) then the system 400 preferably transmits an e-mail message back to the sender 12 indicating the format for usernames followed for that domain name address (e.g., pb.com) (step 552). An example of such a message is:

THERE IS NO KNOWN E-MAIL ADDRESS FOR DOUGLAS.QUINE@PB.COM—HOWEVER, THE FORMAT FOR USERNAMES RESIDING AT PB.COM IS TO USE THE FIRST SIX CHARATERS OF THE LAST NAME FOLLOWED IMMEDIATLY BY THE FIRST TWO CHARACTERS OF THE FIRST NAME—FOR EXAMPLE: MR. TOM WATSONER WOULD BE WATSONTO@PB.COM AND MS. ADELE ZON WOULD BE ZONAD@PB.COM—TRY TO REFORMAT YOUR USERNAME IN ACCORDANCE WITH THIS FORMAT AND RE-TRANSMIT YOUR E-MAIL MESSAGE—GOOD LUCK.

If yes, that is an analysis is to be performed for the undeliverable e-mail address (e.g., Douglas.quine@pb.com), then an analysis of the username portion (e.g., Douglas.quine) of the undeliverable e-mail address (e.g., Douglas.quine@pb.com) is performed to determine a closest match (based upon prescribed criteria) to a username(s) from all the usernames registered with the system 400 that are associated with the domain name (e.g., pb.com) of the undeliverable e-mail address (step 554). A determination is then made as to whether a closest match(es) has been made (step 556). If, no then the process goes to the above described step 552. If yes, then a message is sent to the originator 12 indicating the closest match(es) that have been determined (step 558). An example of such a message is:

IT HAS BEEN DETERMINED THAT THE CLOSEST MATCH FOR DOUGLAS.QUINE@PB.COM IS QUINEDO@PB.COM. IT IS SUGGESTED THAT THE E-MAIL MESSAGE BE RE-SENT TO THIS E-MAIL ADDRESS.

When the originator 12 receives this e-mail message suggested the closest match alternative e-mail address (e.g., quinedo@pb.com) (step 560) the sender may then retransmit the once undeliverable e-mail message to the closest match e-mail address (step 562).

A high level operational flow of the combined e-mail forwarding and correction system 400 is provided in FIG. 6. At the beginning of step 600, the undeliverable message is submitted to the system 400. The message may have previously been sent and returned to the sender as undeliverable, or the sender may choose to submit the message to the system 400 prior to sending it. Along with the message to be forwarded, the sender may also submit the name of the intended recipient and/or the name of the organization of the recipient. Such recipient information can assist in determining whether the appropriate domain information and e-mail address format has been used in connection with the message. Even if the address forwarding and address correcting routines were unable to derive enough information from the undeliverable address to provide a corrected address, the submitted recipient information could be compared with information about registered e-mail addresses for a given domain, and an appropriate e-mail address for an intended recipient may be identified.

For example, suppose that Elizabeth Jones had an e-mail account "lisa@example.com," but that a sender of a message had incorrectly tried to send her a message at "ejones@example.com." The e-mail addresses are different enough that correction techniques would have difficulty connecting the two. However, if the sender identified that he was trying to reach Elizabeth Jones, then a link to the "ejones" characters can be made. The link is further confirmed and solidified if the "lisa" address is registered as belonging to Elizabeth Jones, and the recipient information submitted by the sender matches recipient information associated with the e-mail address.

After the message and any additional recipient information is submitted, at step 620 the system checks to see whether the undeliverable address is registered as having a corresponding forwarding address. If so, the message is simply forwarded to the forwarding address in the manner described previously with respect to e-mail forwarding module 410.

If there is no corresponding forwarding address, at step 630, the e-mail address is compared to registered e-mail addresses to determine whether there is a close match, using a process such as the one described above with respect to FIGS. 5A and 5B. If a close match is found, then the sender may be notified at step 632. Upon receiving the notification, the sender may choose whether or not to use the suggested address (step 634). If the sender chooses to send the message, it can be automatically sent, as in step 636. If not the process ends at step 637.

If no forwarding address or close match to a registered address is found, at step 640 an address correction routine, such as described above with respect to FIG. 3 may be implemented. If it is determined that the address correction routine generated a suggested correction at step 650, then the suggestion can be transmitted to the original sender in step 652. If none of the above steps are successful in providing a forwarding address or a suggested correction, then a message may be transmitted to the originator indicating so at step 660.

Figure 7:
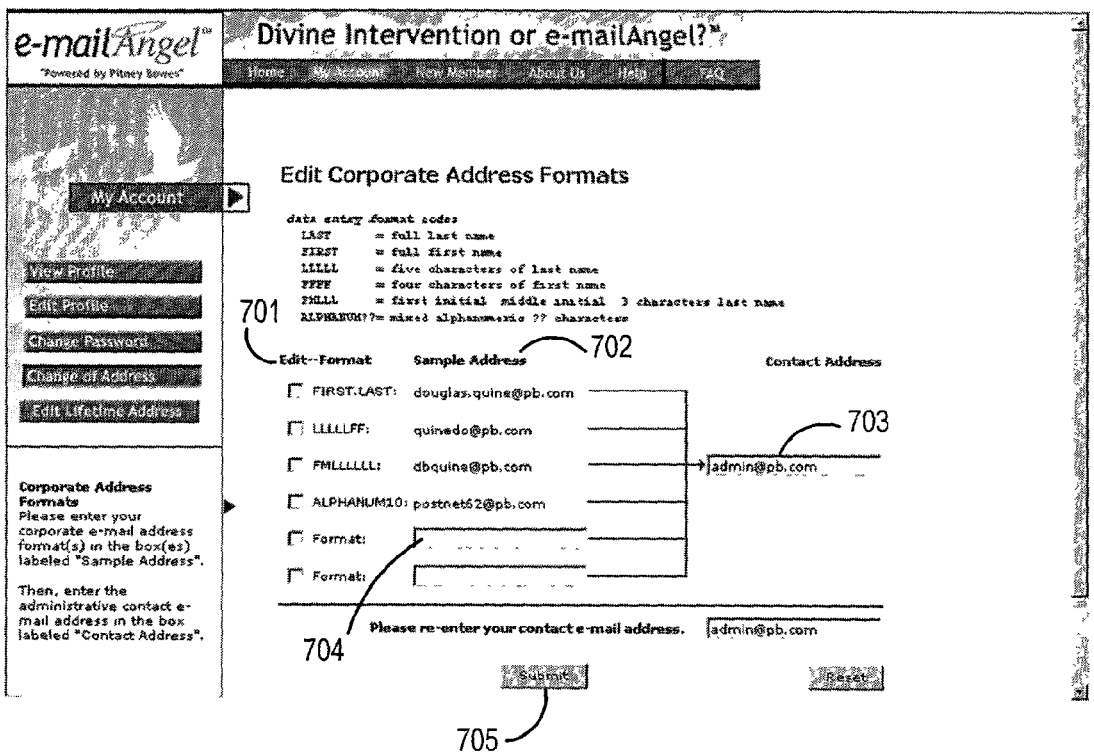
FIG. 7 depicts an interface for registering corporate e-mail address formats.

As discussed above, registration of e-mail addresses in connection with an e-mail forwarding and correction system 400 can increase the likelihood that an undeliverable message can be properly directed. However, the benefits of registration need not rely solely on individuals signing up for the services of system 400. A particularly advantageous embodiment of the present invention may be implemented by a corporation, or any large organization, wishing to centralize, expedite, and control delivery its e-mail communications. In this embodiment, a corporation having an e-mail system can register all of the e-mail addresses under its control. When a corporation registers for the services of the system 400, efficient bulk uploads of e-mail address information, address format information, domain name information may be implemented. This capability allows corporations who have changed name formats (e.g. QuineDo@pb.com becomes Douglas.Quine@pb.com) or domain names due to mergers (e.g. Jim.Jones@bought.com becomes Jim.Jones@buyer.com) to have mail addressed to their disfavored e-mail address redirected to their current addresses. As shown in FIG. 7, registration may also be performed solely for the purpose of entering a domain's e-mail address format rules into the system 400.

As changes occur in the organizations and forwarding addresses become necessary, whether from changing employees, changes to domain names, or changes to naming formats, then the changes for the associated addresses can be uploaded and implemented by the system 400. Under this embodiment, domain owners can also upload changes to domain addresses or naming formats in order to expedite the e-mail address cleansing and hygiene procedures described herein, to allow quicker and more accurate delivery of misaddressed e-mail messages.

As seen in FIG. 7, system 400 can provide an interface to gather corporate e-mail address format information that will increase the usefulness and accuracy in address format correction capabilities. Such an interface may be presented via an INTERNET web-site. In column 701, an administrator for the organization can select a predetermined address format corresponding to the corporate domain. An example of the different formats is provided in column 702. If the desired format is not listed in column 701, the format may be entered in fields 704. Field 703 includes the contact address for the organization responsible for the domain. When the e-mail address format information has been filled out, it can be submitted by activating the submit button 705.

A system of gathering e-mail address format data from the owner of domain, as depicted in FIG. 7, is a direct approach to identifying domain address formats for inclusion in the domain name and domain format database 204. However, less direct methods may also be used to determine address formats for domains.

The less direct methods involve gathering e-mail addresses and analyzing them to determine, to some degree of confidence, what the format rules appear to be applicable for particular domains. Accordingly, as shown in FIG. 8, e-mail addresses may be gathered from a variety of sources.

Information 801 is gleaned by a software program, or a "bot," of the conventional variety, that gathers information from the INTERNET. Such bot collected information 801 specifically includes e-mail addresses which are displayed on web-sites throughout the INTERNET 22. E-mail addresses may be identified by their distinct characteristics, such as the inclusion of the "@" symbol, or by the fact that they are often written as activatable hot links. Such e-mail hot links typically have a characteristic appearance in the web space code as: "mailto:quinedo@pb.com."

E-mail addresses included in e-mail forwarding service information 803 may be used not only for the purposes of forwarding messages, but also to provide data to analyze trends in domain format rules. When a registrant identifies a disfavored address and a forwarding address, those addresses may become raw data for analyzing domain formats. Corporate registration information 805, gathered as discussed above, is another available source of raw e-mail address information. Such corporate registration information may be particularly useful since it is likely to provide for most or all of the addresses for a particular domain.

E-mail addresses data may be acquired from address book information 807. A user taking advantage of the present system may choose to submit personal address book information 807 to support the accuracy of the present invention. Such information 807 may be gathered from an address book resident on an individual's PC, or address books that are stored on-line. Corporate e-mail address books 807 may also be submitted to increase the data available for analyzing domain format rules. In downloading corporate e-mail address book information 807, the present invention may also advantageously and simultaneously determine if there are aberrations or errors within the corporate e-mail addresses, and such information may be communicated back to the corporation.

Finally, public e-mail address directories 809 may be input to the system for determining domain address format rules. Such directories 809 may be on-line and accessible through the INTERNET, or they may be published in electronic or paper format.

The present invention also provides steps for deriving format rules without having them provided by the party responsible for the domain. Pursuant to the present invention, raw e-mail address data may provide the necessary information. As shown in FIG. 8, the raw e-mail address data is submitted to an address format analyzing module 820 which performs statistical analyses on the e-mail addresses to derive the format rules for particular domains. FIG. 9 provides a table of sample data and analysis, as may be conducted by the address format analyzing module 820. In addition to the embodiment of the present invention that analyzes the e-mail address data on its own merits, an alternative embodiment of the invention may also consider additional information regarding the e-mail address. For example, an address book may include a listing of the names of intended recipients associated with the e-mail address. Thus in testing whether a given address is consistent with a format rule, a result may be tested by comparing the address against information about the addressee. This technique may be particularly useful when the format being considered is related to a name of the intended recipient. Under this alternative embodiment, a higher degree of certainty may be achieved where such additional information is available, and where such additional information is relevant to formulation of e-mail addresses.

In order for the e-mail address format rule analyzing aspect of the present invention to provide useful output, it is important to have a sufficiently large quantity of data that a high statistical degree of confidence is achieved. When a such a large quantity of e-mail addresses have been accumulated, the data is sorted by domain names. By examining the characteristics of the identifier portion of collected e-mail addresses for a given domain, patterns may emerge that indicate that a certain rule is being followed.

Statistical measures of the occurrence of identifiable patterns may indicate the presence of a rule for a domain. For example, if it is found that 95% of the addresses for the "pb.com" domain are consistent with a format rule using the first six letters of a person's last name and the first two letters of a person's first name (the "LLLLLLFF" rule), and that 5% of the addresses include no discernable pattern, then it may be found with a high degree of certainty that the pb.com uses a LLLLLLFF rule. Addresses that are consistent with the LLLLLLFF rule (first six letters of last name, first two letters of first name) may also be found to be consistent with a LLFF, LLLFF, LLLLFF, or LLLLLFF rules. However, addresses that are found to be regularly consistent with the first seven letters of last names (LLLLLLL . . . ) will not be consistent with the LLLLLLFF (first six letters of last name) rule.

Perfect matches to a rule for any given domain would not be expected due to the fact that some first names can also be last names, errors in data collected from address books and other sources, and unusual or unique names. If it were found that no pattern rose above a minimal threshold of occurrence, then it may be determined that there are no consistent known rules for that domain.

Examples of examined characteristics may include the number of characters in the address. If a large quantity of addresses all had the same length, then a rule requiring the particular length may be inferred. If an statistically abnormal number of addresses fall within a certain range of character length, then it may be inferred that there is a required range between a minimum and maximum number of characters.

Examined characteristics may further include whether the addresses include the presence or absence of certain characters. If all of the addresses include numbers, then a numerical requirement may be inferred. If numbers occur infrequently among names, then it may be inferred that the numbers are used to distinguish between individuals with the same or similar names (e.g. jsmith1, jsmith2). If a pattern of including no delimiting punctuation in the address occurs, then a rule disallowing delimiting punctuation may be inferred. The opposite may also occur if there is a rule requiring delimiting punctuation for addresses.

Another important characteristic is the presence of names, or parts of names, in the addresses. For investigating for the presence of names a name frequency and name spelling database 210 is consulted. Strings of characters from the identifier portion of an email address are compared against known names in the name database 210. Delimiting punctuation such as a period may be used to identify separations between first names and last names in addresses. For example, comparisons to name database 210 may help determine whether an address is in "first.last" format or "last.first."

Address formats using partial first and last names concatenated formats (eg. LLLLFF or FMLLLLL formats) can be derived to a level of certainty by running various length string comparisons against the name database 210. For example, to determine whether the address is consistent with a LLLLFF format one could compare strings of groupings of the first one to seven characters and compare them against the same number of characters for a listing of known last names. If the address indeed uses LLLLFF format, then for the first one to four characters there will be a good correspondence with known last names. However, there will be poor matches for existing names when the groupings of the fifth through seventh characters are considered because of the contamination from the letters from the first name.

The table of FIG. 9 presents exemplary samples of particular e-mail addresses, listed at the top of the columns, and a weighted score for whether the particular address is consistent with a particular format, as listed in the rows in column 902. For the first example in column 904, an America Online (AOL) style address is examined. For this example, the address "POSTNET62@aol.com" includes characteristics which are consistent with an alphanumeric format, and characteristics that are partially consistent with a LLLLLFF format. The first five letters of "POSTENET62" are "POSTN," which is consistent with one or more known last names. However, the rest of the characters, are less consistent with being the first two letters of someone's name. Accordingly, for this example a weighted score of 42% is assigned for the LLLLLFF format. On the other hand, the alphanumeric format, which consists exclusively of letters and numbers, is fully consistent with that address and a score of 100% is assigned for compliance by that particular data sample. The presence of numerals in the address makes it more consistent with being in alphanumeric format, rather than a name related format, and the higher weighted score is awarded accordingly. It is also seen that the AOL sample has characteristics inconsistent with the other formats and scores of 0% are assigned respectively.

In column 906, a sample for a fictitious Argon Corp. e-mail domain is shown. The address includes the characters "DOUGLAS.QUINE." Comparing the two portions separated by the period to a name database 210 it is seen that it is fully consistent with a "first.last" format, and a 100% score is assigned accordingly. None of the other formats are consistent with those characters, except for the fact that "DOUGLAS" may be both a first name and a last name, making the address somewhat consistent with a "last.first" format. However, since "QUINE" is an unknown or rare first name, a relative score of only 21% is assigned for "first-.last." The relative weighted scores reflect the likelihood that one format appears to be more likely correct that the other. In this example, the weighting can be based on the frequencies of the names "Douglas" and "Quine" as they appear as first names and last names in the general population.

Finally in column 908, a Pitney Bowes sample e-mail address is provided including the identifier portion, "QUINEDO." The only two exemplary formats that appear to be consistent with the character string are the alphanumeric format and the LLLLLFF format. Since "QUINE" is consistent with being the first five letters of a last name, and "DO" is consistent with being the first two letters of a first name, then the sample text is considered to be fully consistent with the LLLLLFF format. However, the character string is also fully consistent with the alphanumeric format. Since the likelihood of the LLLLLFF format being satisfied accidentally by these characters is less than that of the alphanumeric format being satisfied accidentally, for this example the LLLLLFF format is weighted more heavily. Thus, for this example, the LLLLLFF format is given a score of 100% and the alphanumeric format is given a score of 85% in column 908.

The respective scores for individual e-mail address samples, as shown in FIG. 9, may be tabulated for a larger sample of addresses for a particular domain. Alternatively, a count may be kept for the number of times that a particular format had the highest score. The final tabulations and counts for the respective formats may be considered for identifying a pattern for a particular domain. A higher number for a particular format will indicate a higher likelihood that the domain uses the corresponding format rule. Rules need not be mutually exclusive from one another. For example, a format limiting the number of characters may be used in conjunction with a format using a recipients name. If such were the case for a particular domain, then a pattern indicating consistency with both formats would be found.

Some of the techniques for analyzing address for determining format as just described may also be useful for analyzing individual addresses that are being checked for address format compliance by checker module 205. The converse is true in that features of the checker module 205 already described may be useful for the process of deducting domain formats to include in domain database 210.

Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for determining an e-mail address formatting rule corresponding to a domain name, the method comprising:

gathering e-mail address data corresponding to the domain name;

determining the e-mail address formatting rule from a group of formatting rules for the unique identifier portion of the e-mail address based on the gathered e-mail address data; and electronically storing an association of the e-mail address formatting rule with the domain name, wherein the e-mail address data comprises a first e-mail address, and the step of determining the e-mail address formatting rule further comprises:

parsing a domain portion of the first e-mail address;

parsing an identifier portion of the first e-mail address; and determining whether the identifier portion is consistent with one or more known e-mail address formatting rules from a group of at least two known e-mail address formatting rules, wherein the one or more known e-mail address formatting rules are from a list consisting of: last.first, first.last, alphanumeric only, LLLLLLFF, FFLLLLLL, FMLLLLLL, telephone number, punctuation required, minimum number of characters, or maximum number of characters.

2. A method for determining an e-mail address formatting rule corresponding to a domain name, the method comprising:

gathering e-mail address data corresponding to the domain name;

determining the e-mail address formatting rule based on the gathered e-mail address data; and electronically storing an association of the e-mail address formatting rule with the domain name, wherein the e-mail address data comprises a first e-mail address, and the step of determining the e-mail address formatting rule further comprises:

parsing a domain portion of the first e-mail address;

parsing an identifier portion of the first e-mail address; and determining whether the identifier portion is consistent with one or more known e-mail address formatting rules, wherein the step of determining whether the identifier portion is consistent with one or more known e-mail address formatting rules further comprises:

comparing the identifier portion to a list of known names;

identifying some or all the identifier portion as consistent with one or more known names;

determining whether the identifier portion is consistent with one or more known e-mail address formatting rules that are a function addressees' names, wherein the step of determining whether the identifier portion is consistent with one or more known e-mail address formatting rules further comprises:

assigning first probabilities that some or all of the identifier portion corresponds to one or more names on the list of known names, based in part on a frequency of the names in a general population;

assigning second probabilities that one or more known e-mail address formatting rules are applicable to the first e-mail address, the second probability being a function of the first probability; and selecting the e-mail address formatting rule for the first e-mail address based on the known e-mail address formatting rule that has the best second probability.

3. A method for determining an e-mail address formatting rule corresponding to a domain name, the method comprising:

gathering e-mail address data corresponding to the domain name;

determining the e-mail address formatting rule based on the gathered e-mail address data; and electronically storing an association of the e-mail address formatting rule with the domain name, wherein the step for determining the e-mail address formatting rule further comprises:

for a plurality of e-mail addresses having the same domain portion as the first e-mail address, performing the steps of parsing a plurality of identifier portions of the plurality of e-mail address;

comparing the plurality of identifier portions to the list of known names;

identifying some or all the plurality of identifier portions as consistent with one or more known names;

assigning first probabilities that some or all of the plurality of identifier portions corresponds to one or more names on the list of known names, based In part on a frequency of the names in a general population:

assigning second probabilities that one or more known e-mail address formatting rules are applicable to one of the plurality of e-mail addresses, the second probability being a function of the first probability; and assigning third probabilities that one or more known e-mail address formatting rules are applicable to the plurality of e-mail addresses based on the cumulative second probabilities; and wherein the step of selecting the e-mail address formatting rule for the domain of the first e-mail address is based on the known e-mail address formatting rule that has the best third probability.

* * * * *